United States Patent [19]

Krieger

[11] Patent Number: 5,288,737
[45] Date of Patent: * Feb. 22, 1994

[54] WASTEWATER TREATMENT APPARATUS

[75] Inventor: Joseph P. Krieger, Edmond, Okla.

[73] Assignee: Hydro Modular Systems, Inc., Okla.

[*] Notice: The portion of the term of this patent subsequent to Dec. 22, 2009 has been disclaimed.

[21] Appl. No.: 969,615

[22] Filed: Oct. 30, 1992

Related U.S. Application Data

[63] Continuation of Ser. No. 616,583, Nov. 21, 1990, Pat. No. 5,173,184.

[51] Int. Cl.$^5$ .............................................. C02F 1/24
[52] U.S. Cl. ............................ 210/195.1; 210/196; 210/199; 210/221.2; 210/241; 210/258; 210/320
[58] Field of Search .................. 210/195.1, 196, 199, 210/221.2, 241, 258, 320, 201, 221.1, 255

[56] References Cited

U.S. PATENT DOCUMENTS

| | | | |
|---|---|---|---|
| 832,914 | 10/1906 | Law | 210/5 |
| 1,314,955 | 9/1919 | Flicker | 210/5 |
| 1,440,254 | 12/1922 | Travers | 210/5 |
| 2,799,645 | 7/1957 | Musgrove | 210/5 |
| 3,056,749 | 10/1962 | Griffith | 252/361 |
| 3,133,017 | 5/1964 | Lambeth | 210/5 |
| 3,355,023 | 11/1967 | Foster | 210/221.1 |
| 3,515,278 | 6/1970 | Wilson | 210/109 |
| 3,694,353 | 9/1972 | Yang et al. | 210/221.1 |
| 3,735,870 | 5/1973 | Uden | 210/138 |
| 3,820,659 | 6/1974 | Parlette | 210/195.1 |
| 3,945,918 | 3/1976 | Kirk | 210/44 |
| 4,021,347 | 5/1977 | Teller et al. | 210/195 |
| 4,092,249 | 5/1978 | Lagatta | 210/195 |
| 4,116,835 | 9/1978 | Bertelson | 210/100 |
| 4,278,546 | 7/1981 | Roesler | 210/626 |
| 4,344,845 | 8/1982 | Pielkenrood | 210/199 |
| 4,378,290 | 3/1983 | Kennedy, Jr. | 210/103 |
| 4,462,903 | 7/1984 | Wettengl | 210/150 |
| 4,618,430 | 10/1986 | Favret, Jr. et al. | 210/150 |
| 4,659,458 | 4/1987 | Chin et al. | 210/221.1 |
| 4,800,025 | 1/1989 | Bibaeff . | |
| 4,950,396 | 8/1990 | Skaar et al. | 210/195.3 |

Primary Examiner—Thomas Wyse
Attorney, Agent, or Firm—Dunlap, Codding & Lee

[57] ABSTRACT

A wastewater treatment system for treating wastewater containing undesirable pollutants which comprises a housing having a bottom and defining an internal chamber. The internal chamber is provided with a first and second baffle member which cooperate to define a mixing zone and a separation zone. Wastewater (containing a sufficient amount of air so that the air present in the wastewater exceeds the solubility of air in the wastewater) is introduced into the mixing zone of the internal chamber, and an aerated water is sprayed into the wastewater to produce a quantity of air bubbles sufficient to promote the flotation of pollutants having a density approximately equal to that of the wastewater to form a froth. Pollutants having a density substantially greater than the density of water settled to the bottom portion of the housing. An effluent reservoir assembly (which forms a reservoir zone) is spatially disposed from the second baffle member so that a quiescent zone is formed therebetween. The effluent reservoir assembly is provided with a fluid inlet opening and a fluid outlet opening and defines a fluid flow passageway between the reservoir zone, the first quiescent zone and the effluent discharge zone. When it is determined that the wastewater should be subjected to additional treatment, an effluent transfer assembly can be incorporated into the housing for selectively passing a portion of the treated wastewater from the effluent reservoir assembly to the mixing zone of a treatment cell. In such instance, additional air is introduced into the treated wastewater prior to discharge into the mixing zone to promote mixing and to insure that the amount of air present in the treated wastewater is an amount sufficient to exceed the solubility of air in the treated wastewater. An effluent discharge assembly is supported by the housing in a spatially disposed position relative to the effluent reservoir assembly so as to define the effluent discharge zone of the chamber therebetween. The effluent discharge assembly is adapted to discharge the treated wastewater from the effluent discharge zone for discharge into a sewer or for reuse.

25 Claims, 5 Drawing Sheets

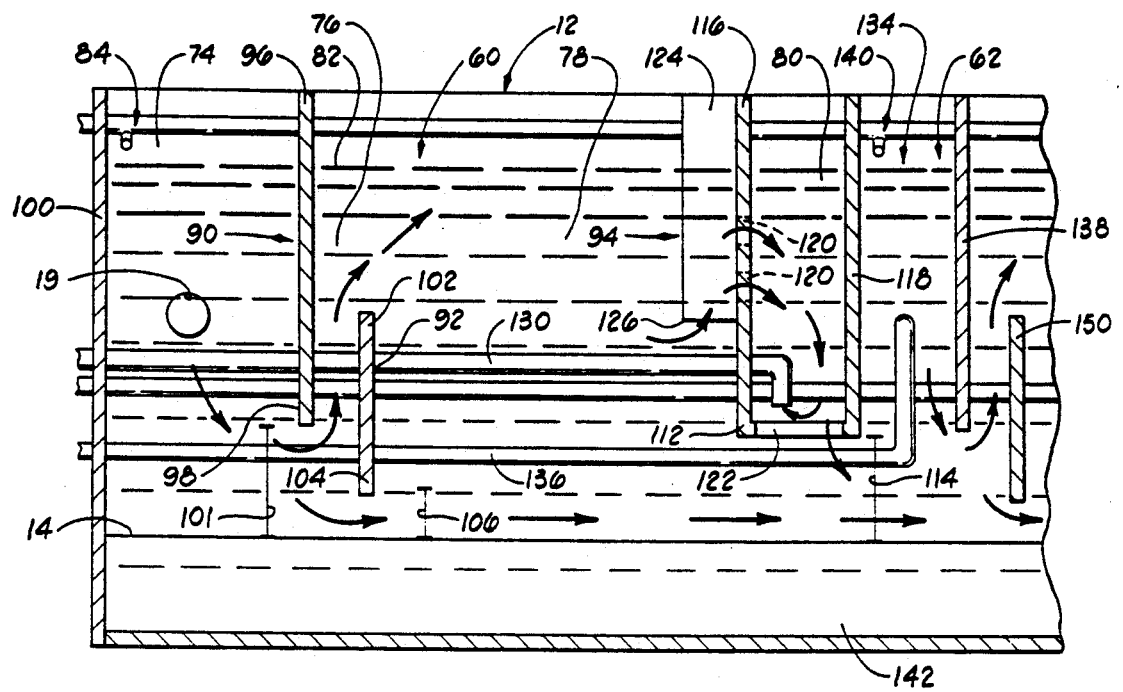
FIG. 3
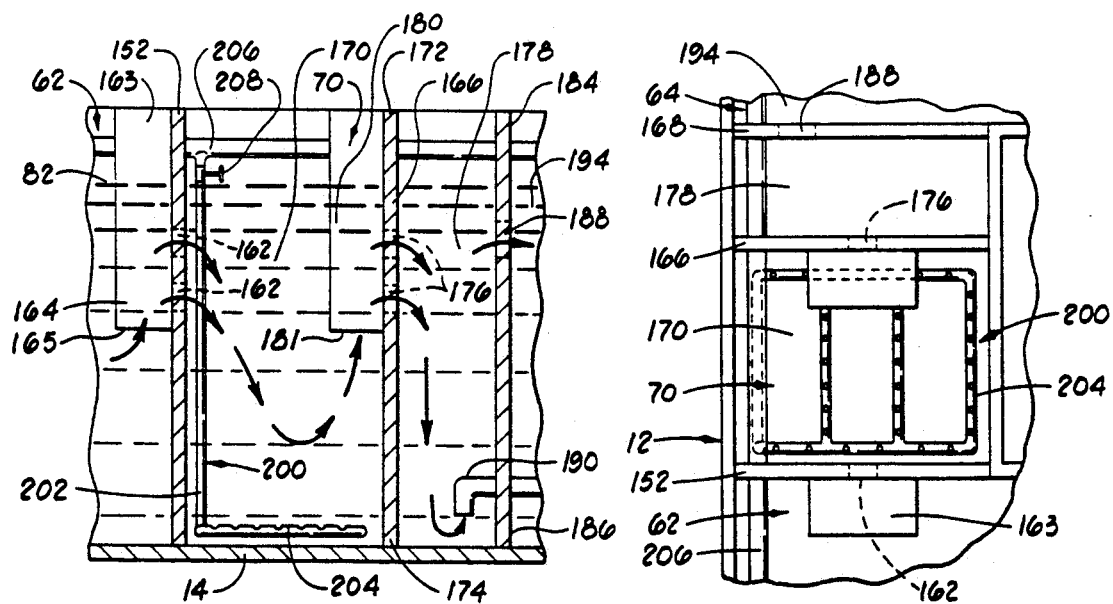
FIG. 4
FIG. 4A

WASTEWATER TREATMENT APPARATUS

This is a continuation of co-pending application Ser. No. 616,583 filed on Nov. 21, 1990, entitled WASTEWATER TREATMENT APPARATUS, now U.S. Pat. No. 5,173,184.

BACKGROUND OF THE INVENTION

1. Field of the Invention

The present invention relates to the treatment of wastewater and more particularly, but not by way of limitation, to a device and method which uses air bubbles and treatment chemical to remove pollutants therefrom so that the treated water can be discharged or reused.

2. Brief Description of the Prior Art

Federal, state and local regulations limit the amount of hydrocarbons, suspended solids and certain dissolved contaminants which can be discharged to a sewer. Water to be recirculated, e.g., industrial process water, must be cleaned up before reuse. Industrial plants can either clean the wastewater prior to discharge or pay substantial disposal costs for the removal and subsequent treatment of the wastewater. Because liability for spills of wastewater removed for treatment and disposal remains on the generator, it is desirable to treat the water on-site for reuse (also referred to herein as recycle) or discharge.

Suspended solids refers to particulate matter not soluble in water. The name implies that the density of the solids is not great so the particles do not settle. Suspended solids are of two basic types: primary particles (i.e., particles not easily broken up in a wastewater treatment system) and aggregates (small groups of primary particles that can be made to associate into large, tuft-like groups). Aggregates, which settle more rapidly, look like "flocs" of cloth; hence the term "flocculation" is frequently used to refer to the process by which the large aggregates are formed.

When aggregates of oil come together to form oil droplets, the process is called "coalescence." Since oil droplets are liquid they can flow together to form a larger drop—a desirable step, especially if the oil is to be recovered. However, oil droplets can also behave similarly to solid particles, i.e., they can be aggregated or "flocced" in the same way as suspended solids, with each oil droplet retaining its original size and shape. The aggregation of oil particles is an adequate way to remove oil from water, since flocculation is quick. Furthermore, the process brings solids along with the oil to produce wastewater having a reduced level of contaminants.

The speed at which particles settle through water is governed by Stokes' equation which is as follows:

$$V_s = \frac{g(p_1 - p_2) D^2}{18n}$$

where
g = gravity constant
$p_2$ = particle density
$p_1$ = liquid density
D = particle diameter
n = liquid viscosity When the density difference is a negative number, i.e., when the particle density is less than the liquid density, the velocity term $V_s$ will be negative. A negative velocity term means the particle will float rather than settle. A close inspection of Stokes' equation reveals that denser particles settle faster, less dense particles float faster (the absolute value of the negative velocity term will be greater), high viscosity fluids reduce the settling velocity and large particles settle more rapidly than small particles.

Numerous processes and apparatuses have been used to remove contaminants, such as hydrocarbons and suspended solids, from wastewater so the wastewater can be safely discharged or recycled for further use prior to discharge. The most commonly used processes employ gravity separation and air flotation. In gravity separation, clarifiers are used to effect the separation of suspended solids from the wastewater, while API Separators are used to remove hydrocarbons from wastewater; whereas, in air flotation, dissolved air flotation and induced air flotation technologies are commonly used for the simultaneous removal of hydrocarbons and suspended solids.

Clarification is a gravity separation process wherein the wastewater is passed through a basin or tank and the suspended solids are permitted to settle to the bottom for collection and disposal Treated wastewater having a reduced amount of suspended solids is removed at a point near the surface, typically over a weir. A skimming device is frequently employed to remove small amounts of floating material The clarification process assumes the suspended solids have a density greater than that of the wastewater being processed.

Hydrocarbon contaminants, also referred to herein as oil and grease, generally are characterized by densities less than or near the density of water. In an API Separator, the wastewater is passed through a tank wherein the hydrocarbon contaminants tend to rise to the surface. The American Petroleum Institute has calculated the physical dimensions of a tank which will theoretically result in the capture of all hydrocarbons having a particle diameter in excess of 150 microns for a given specific gravity of oil and the specific gravity of water at treatment temperature; hence, the designation API Separator.

In the dissolved air flotation (DAF) process, the wastewater (or a portion thereof) is saturated with air under pressure (typically about 60 psig) and then introduced through a submerged inlet into an open treatment reservoir. At ambient pressure, the solubility of air in water is diminished so that an excess of air is released from the wastewater in the form of very small bubbles. As the air bubbles move toward the surface of the wastewater, they contact and attach to particulate contaminates to form a particle-air aggregate having a lower density than the density of the particle alone. Since the vertical velocity is directly proportional to the difference between the density of water and the density of the particle, a decrease in the density of the particle (because it is now attached to air) results in an increase in the vertical velocity of the particle in water. That is, the particle-air aggregate moves toward the surface of the water more rapidly. The contaminants are skimmed from the surface of the wastewater to produce a treated wastewater containing a reduced amount of contaminants. Typically, a recycle stream of treated wastewater (amounting to about thirty percent of the total flow) is saturated with air in a pressure tank, then combined with the "dirty" wastewater at reduced pressure to distribute air bubbles throughout the recycle/dirty wastewater mixture.

In the induced air flotation (IAF) process, air is induced into the wastewater by mechanical means. The induced air forms bubbles which rise toward the surface of the wastewater. As the bubbles move upward, they contact and become attached to particulate contaminants to promote flotation of the contaminants which are then skimmed (or decanted) from the surface. As in the DAF process, the bubbles function to increase the vertical velocity of the particulate contaminants in accordance with Stokes' Law. The air bubbles produced in the IAF process tend to be substantially larger than those produced in the DAF process, with a resulting smaller surface area for aggregation with particulate contaminants. Unlike the DAF process, however, the IAF process requires no recycle stream or pressure tank. In the typical installation, wastewater is passed serially through several IAF "cells" to produce treated water of acceptable quality for discharge or reuse. While the DAF process has been successful in treating industrial wastewaters having contaminant levels of up to 20,000 milligrams per liter (mg/L), the IAF process is generally considered to be limited to a substantially lower maximum level of contaminants.

The efficiency of the treatment for a given wastewater is dependent, in part, on the size and amount of the air bubbles which attach to the particulate contaminants. Neither the optimum size nor the optimum amount of air bubbles is universal; rather, the optimum amount and size of air bubbles vary with the characteristics of the contaminants in the wastewater. Both the DAF and IAF processes have relatively limited ability to vary the size and amount of air bubbles in a given installation. In the DAF process, the amount of air may be increased by increasing air pressure in the saturation tank or by increasing the percentage of recycled (pressurized) water. In the IAF process, the amount of air is controlled by the design and speed of the mechanical impeller which creates a vortex to induce air into the wastewater.

The DAF and IAF processes encounter limited success where the wastewater contains a high level of contaminants, e.g., suspended solids in excess of 20,000 mg/L for DAF and a somewhat lower limit for IAF. DAF and IAF processes are continuous by design and do not readily lend themselves to batch treatment of wastewater. Further, both the DAF and IAF processes rely on the random contact of rising air bubbles with particulate contaminates to form an air-particle aggregate of reduced density.

The use of chemical treatment to assist in removing pollutants from industrial wastewater is also well known. Chemicals are commonly used for pH adjustment and for reaction with specific pollutants. Furthermore, certain treatment chemicals promote the formation of aggregates of either suspended solids or oil and grease having larger diameters and, therefore, an increased settling velocity. According to Stokes' equation, the vertical velocity of a particle in water is directly proportional to the square of the particle's diameter. Thus, a twofold increase of the particle diameter will produce a fourfold increase in the vertical velocity. A particular contaminant having a diameter 2D will move either to the surface or to the bottom of a stream of water in one-fourth the time required for a particular contaminant otherwise identical having a diameter D.

In clarification and flotation processes, the use of chemicals improves efficiency by promoting the aggregation of smaller particles into larger particles which settle out (or rise to the surface) more rapidly. The result is an effluent wastewater having a reduced level of suspended solids and hydrocarbons.

While the before mentioned processes have met with limited success in the treatment of wastewater, especially industrial wastewater, new and improved processes and apparatuses are constantly being sought which overcome the problems inherent in the prior art processes and which permit one to comply with the various federal, state and local regulations relating to the discharge of industrial wastewater. It is to such a process and apparatus that the present invention is directed.

SUMMARY OF THE INVENTION

According to the present invention, a wastewater treatment system is provided wherein wastewater containing undesirable pollutants can be effectively and efficiently treated to provide a treated wastewater suitable for reuse or discharge. Broadly, the wastewater treatment system comprises a housing having a bottom and defining an internal chamber. The internal chamber is provided with a mixing zone, a separation zone, a quiescent zone, a reservoir zone and an effluent discharge zone through which water being treated is sequentially passed. Wastewater containing a sufficient amount of air so that the air present in the wastewater exceeds the solubility of air in the wastewater is introduced into the mixing zone of the internal chamber, and an aerated water is sprayed into the wastewater to produce a quantity of air bubbles sufficient to promote the flotation of pollutants having a density approximately equal to that of the wastewater to form a froth. Pollutants having a density substantially greater than the density of water settled to the bottom portion of the housing.

A first baffle member is supported by the housing so as to be spatially disposed from one end of the internal chamber. Thus, the first baffle member and the internal chamber cooperate to define the mixing zone. The first baffle member is supported within the internal chamber so that a fluid flow passageway is provided below the first baffle member from the mixing zone to the separation zone.

A second baffle member is also supported by the housing so as to be spatially disposed from the first baffle member. Thus, the first and second baffle members cooperate to define the separation zone of the internal chamber. The second baffle member further defines an upper fluid flow passageway from the separation zone to the quiescent zone of the chamber; and the lower end of the second baffle member defines a lower fluid flow passageway from the separation zone to the quiescent zone.

An effluent reservoir assembly (which forms the reservoir zone) is spatially disposed from the second baffle member so that the quiescent zone is formed therebetween. The effluent reservoir assembly is provided with a fluid inlet opening and a fluid outlet opening and defines a fluid flow passageway between the reservoir zone, the first quiescent zone and the effluent discharge zone.

When it is determined that the wastewater should be subjected to additional treatment, an effluent transfer assembly can be incorporated into the housing for selectively passing a portion of the treated wastewater from the effluent reservoir assembly to the mixing zone of a treatment cell. In such instance, additional air is introduced into the treated wastewater prior to discharge into the mixing zone to promote mixing and to insure that the amount of air present in the treated wastewater is an amount sufficient to exceed the solubility of air in the treated wastewater.

An effluent discharge assembly is supported by the housing in a spatially disposed position relative to the effluent reservoir assembly so as to define the effluent discharge zone of the chamber therebetween. The effluent discharge assembly is adapted to discharge the treated wastewater from the effluent discharge zone for discharge into a sewer or for reuse.

An object of the present invention is to provide a method and apparatus for removing contaminants from wastewater to produce effluent suitable for recycle or discharge.

Another object of the invention, while achieving the before stated object, is to provide a method and apparatus for removing hydrocarbons and suspended solids from industrial wastewater.

Another object of the invention, while achieving the before stated objects, is to provide a method and apparatus for processing industrial wastewater containing high levels of suspended solids and hydrocarbon contaminants.

Other objects, features and advantages of the present invention will be apparent from the following detailed description when read in conjunction with the drawings and appended claims.

BRIEF DESCRIPTION OF THE DRAWINGS

FIG. 4 is a cross-sectional view of another portion of the internal treatment chamber of the apparatus of FIG. 2.

FIG. 4A is a top plan view of a portion of the internal treatment chamber shown in FIG. 4.

FIG. 7 is a partial cutaway of the wastewater treatment apparatus of FIG. 2.

DETAILED DESCRIPTION

Figure 1:
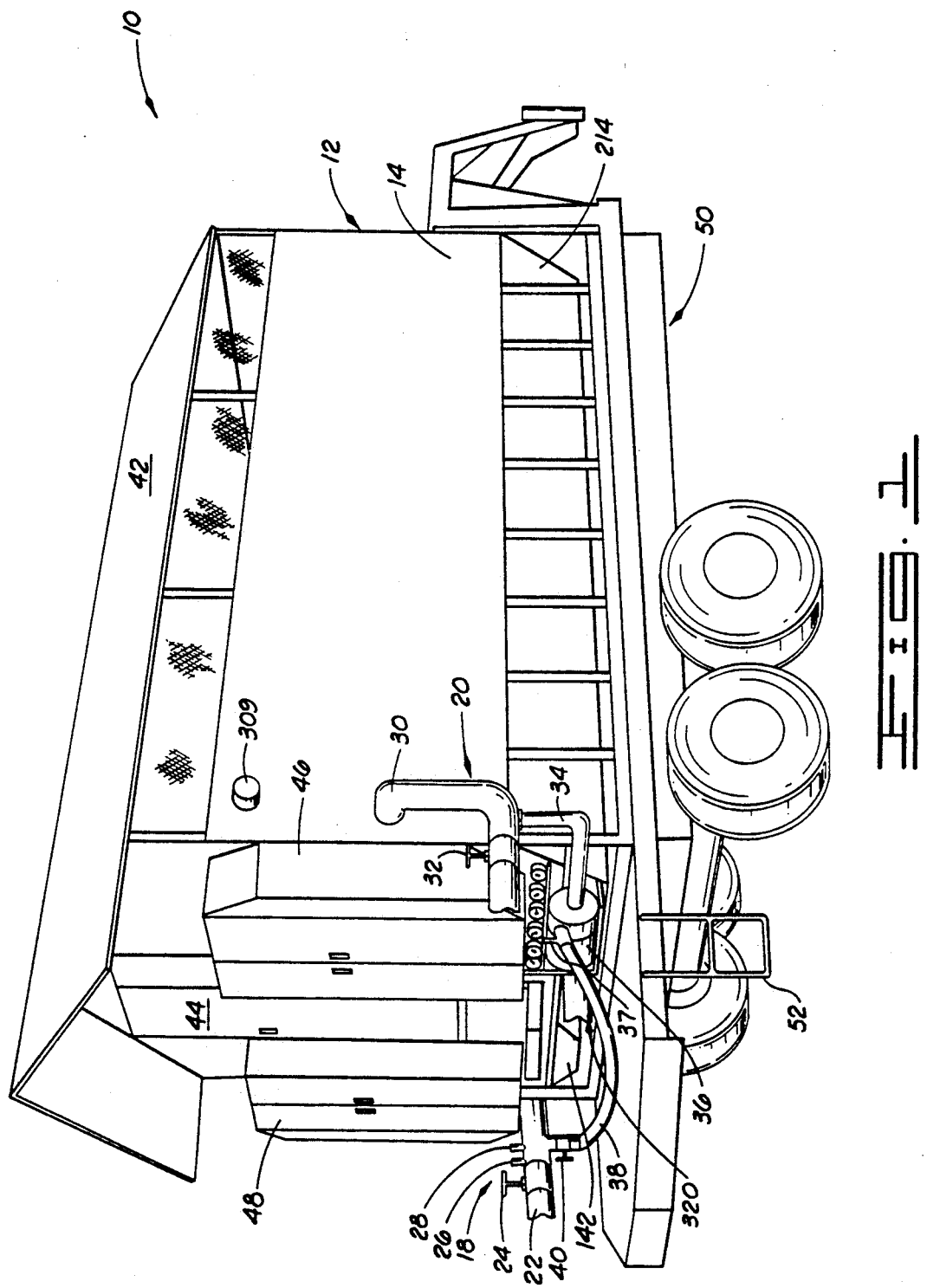
FIG. 1 is a perspective view of a wastewater treatment apparatus of the present invention, the apparatus being shown with a protective roof and mounted on a flat bed trailer.

Referring now to the drawings, and more particularly to FIG. 1, a wastewater treatment apparatus 10 (hereinafter referred to as apparatus) for treating industrial wastewater containing hydrocarbons and suspended solids is shown. The apparatus 10 comprises a housing 12 having a bottom portion 14 so as to define an internal chamber 16 (FIG. 2) adapted to receive the industrial wastewater for passage through the internal chamber 16 of the housing 12 during treatment of same. Industrial wastewater to be treated in the apparatus 10 is introduced into the internal chamber 16 via a fluid inlet assembly 18 which is in fluid communication with the internal chamber 16 via an inlet port 19 (FIG. 3) formed in the housing 12. Treated wastewater is discharged from the internal chamber 16 via a fluid outlet assembly 20 which fluidly communicates with the internal chamber 16 of the housing 12 via an outlet port of the housing 12 (not shown).

The fluid inlet assembly 18 comprises a wastewater inlet line 22 having a control valve 24 disposed therein for selectively controlling the flow of the industrial wastewater into the internal chamber 16. The wastewater inlet line 22 is connected to a suitable wastewater supply, such as a transfer pump (not shown) and a reservoir. The wastewater inlet line 22 is further provided with a pair of injection fittings 26, 28 so that pressurized air and a chemical treating agent can be injected into the wastewater flowing through the wastewater inlet line 22 via the injection fittings 26, 28, respectively.

The fluid outlet assembly 20, which is in fluid communication with the internal chamber 16 via the outlet port (not shown) in the housing 12, comprises a treated wastewater outlet line 30 having a valve 32 therein, a recirculation conduit 34 connected to the wastewater outlet line 30 thereof and to the input port of a pump 36, an air injection fitting 37 for injection of an additional amount of air into the recirculated treated wastewater, and a second recirculation conduit 38 connected to the discharge of the pump 36 and to the wastewater inlet line 22 substantially as shown.

In order to control the flow of the treated wastewater through the recirculation conduits 34, 38 and the pump 36, a valve 40 is disposed within the second recirculation conduit 38. The flow of the treated wastewater from the internal chamber 16 of the housing 12 can thus be selectively controlled for discharge, recirculation, or a combination thereof by manipulation of the valves 32, 40 in a customary manner. That is, when the valve 32 is closed and the valve 40 is open, all of the treated water exiting the internal chamber 16 is directed through the recirculation conduits 34, 38 and the pump 36 for recirculation through the internal chamber 16. Under such circumstances the apparatus 10 can be operated as a batch process.

The housing 12 is further provided with a roof 42, a door 44 and a pair of cabinets 46, 48 for containing auxiliary equipment, such as pumps, valves and the like. The apparatus 10 is illustrated as mounted on a trailer 50 equipped with an access ladder 52. It should be understood that the roof 42, the door 44, the cabinets 46, 48, the trailer 50 and the access ladder 52 are not essential to the operation of the apparatus 10, but afford protection for the apparatus 10 as well as portability when the apparatus 10 is moved from one location to a second location or stored or used in an unprotected area.

Figure 2:
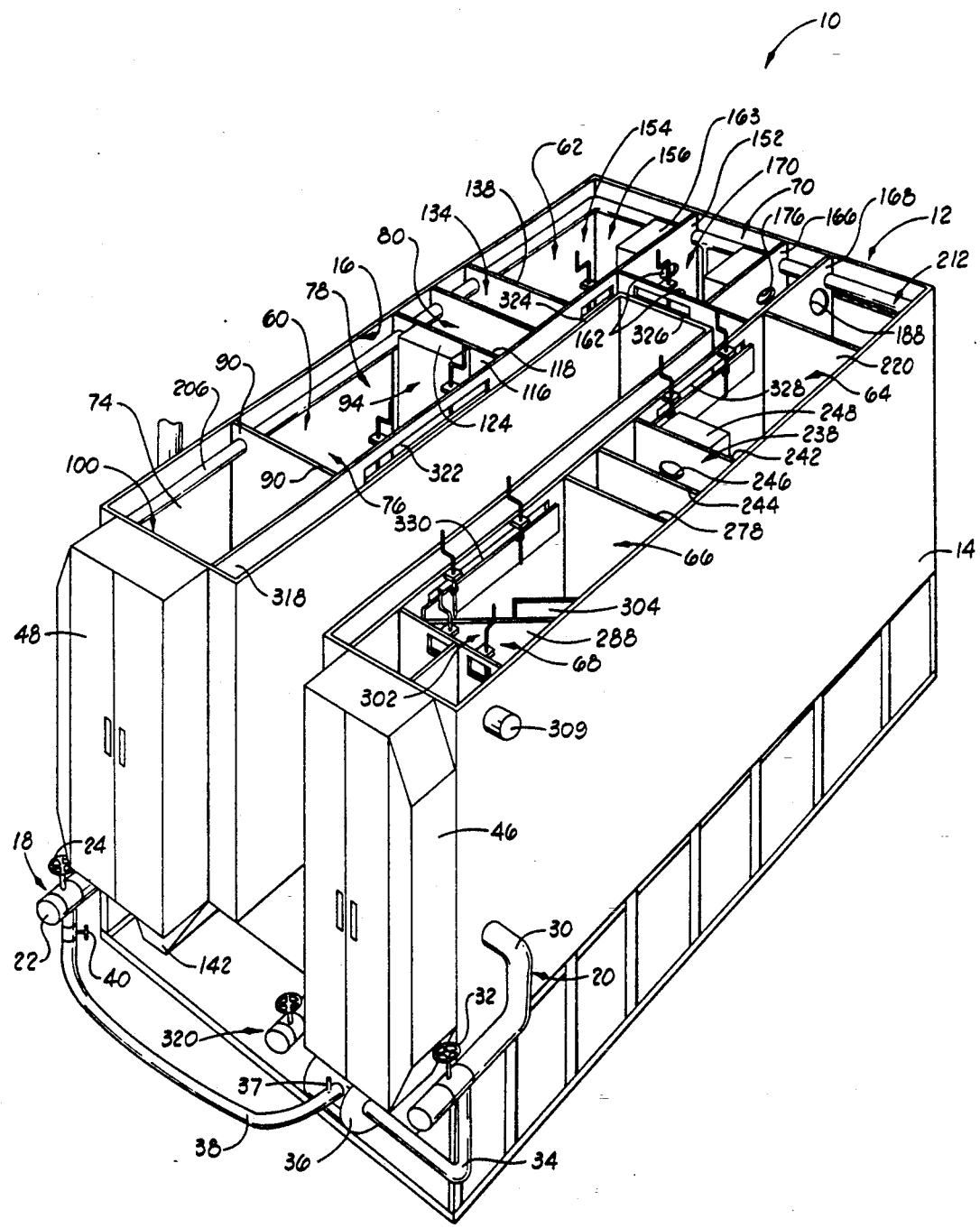
FIG. 2 is a perspective view of the wastewater treatment apparatus in which the roof has been removed.

Referring now to FIGS. 2 and 7, the apparatus 10 is illustrated wherein the roof 42 has been removed and wherein the apparatus 10 has been removed from the trailer 50. As previously stated, the housing 12 of the apparatus 10 is provided with the bottom portion 14 so as to define the internal chamber 16. The internal chamber 16, in turn, defines a plurality of treatment cells, such as treatment cells 60, 62, 64 and 66, an effluent discharge assembly 68 and a mixing/air flotation cell 70. The treatment cells 60–66 can be constructed so as to be substantially identical, or when employing the mixing-/air flotation cell assembly 70 between the intermediate treatment cells 62 and 64, the treatment cells 60 and 64 will be substantially identical in construction, but the treatment cells 62 and 66 will vary in construction as will be described in detail hereinafter. Further, when constructing the apparatus 10 so that the mixing/air flotation cell 70 is not present therein, each of the treatment cells, with the exception of treatment cell 66 (which functions as the terminal treatment cell) will be identical in construction.

While the apparatus 10 has been illustrated as containing the four treatment cells 60–66 in combination with the mixing/air flotation cell assembly 70 and the effluent discharge assembly 68, it should be understood that depending upon the nature of the industrial wastewater to be treated, effective treatment of the wastewater may be obtained wherein the apparatus 10 contains only the initial treatment cell 60 and the effluent discharge assembly 68.

Figure 3:
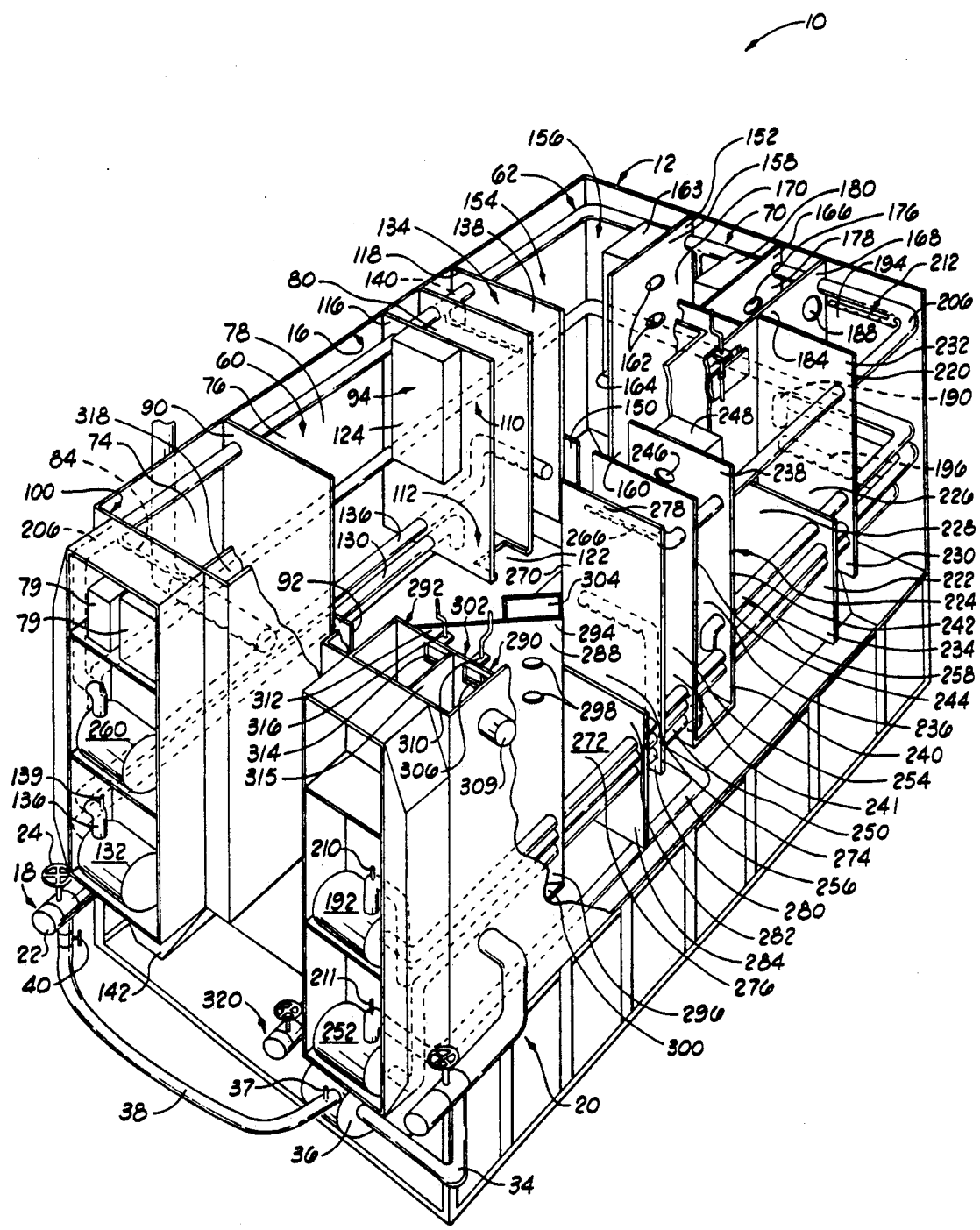
FIG. 3 is a cross-sectional view of a portion of an internal treatment chamber of the apparatus of FIG. 2.

Referring now to FIGS. 3 and 7, the treatment cell 60 will be described in detail. The treatment cell 60 is provided with a mixing zone 74, a separation zone 76, a quiescent zone 78 and a reservoir zone 80. Wastewater containing a sufficient amount of air so that the air present in the wastewater exceeds the solubility of air in the wastewater is introduced into the mixing zone 74 via the inlet port 19 so that the wastewater is discharged at an intermediate position in the mixing zone 74.

The amount of air required in the wastewater to exceed the solubility of air in the wastewater is achieved by injecting compressed air into the wastewater inlet line 22 via the injection fitting 26 (FIG. 1) When it is determined desirable to incorporate one or more chemical treating agents into the wastewater such can also be accomplished by injecting the desired amount of chemical treating agent into the wastewater in the wastewater inlet line 22 via chemical pumps 79 and the injection fitting 28.

Wastewater containing the before stated amount of air and in most instances a chemical treating agent is introduced into the mixing zone 74 until the wastewater reaches a predetermined liquid level 82 in the internal chamber 16. Large air bubbles are formed in the wastewater in the mixing zone 74 and the bubbles tend to rise to the surface of the wastewater. In order to reduce the size of the bubbles in the wastewater, aerated water is directed against the surface of the wastewater in the mixing zone 74 so that the aerated water penetrates into the wastewater and contacts the large air bubbles to substantially reduce the size of the large air bubbles. The aerated water, similarly to the wastewater, contains a sufficient amount of air so that the air present in the aerated water exceeds the solubility of air in water. The aerated water, which can be either potable water or treated wastewater withdrawn from one of the intermediate treatment cells (such as the intermediate treatment cell 64) is discharged onto the surface of the wastewater in the mixing zone 74 by a spray assembly 84.

The wastewater (which now contains a large number of small bubbles) is passed from the mixing zone 74 through the separation zone 76, the quiescent zone 78 and into the reservoir zone 80 along the travel path which assists i the treatment of the wastewater. The water in the reservoir zone 80, which constitutes a treated wastewater, can then be directed through a second treatment cell, such as treatment cell 62, or passed directly to the effluent discharge assembly 68.

The treatment cell 60, which constitutes the initial treatment cell, comprises a first baffle member 90, a second baffle member 92 and an effluent reservoir assembly 94. As will be more fully described hereinafter, the first and second baffle members 90, 92 and the effluent reservoir assembly 94 cooperate with the housing 12 to define a fluid flow path for the wastewater through the treatment cell 60; and the housing 12, in combination with the first baffle member 90, the second baffle member 92 and the effluent reservoir assembly 94 cooperate to define the mixing zone 74, the separation zone 76, the quiescent zone 78 and the reservoir zone 80 of the treatment cell 60.

Referring more specifically to FIG. 3, the fluid flow path of the wastewater through the treatment cell 60 is illustrated, as is the relationship between the housing 12, the first and second baffle members 90, 92 and the effluent reservoir assembly 94.

The first baffle member 90 is provided with an upper end portion 96 and a lower end portion 98. The first baffle member 90 is supported by the housing 12 in a spatial relationship with one end 100 of the housing 12 so that the upper end portion 96 extends upwardly above the predetermined liquid level 82 and the lower end portion 98 terminates a first distance 101 from the bottom portion 14 of the housing 12. Thus, the first baffle member 90 and the end 100 of the housing 12 cooperate to define the mixing zone 74, while providing a fluid flow passageway below the lower end portion 98 of the first baffle member 90 to the separation zone 76 substantially as shown.

The second baffle member 92 is also provided with an upper end portion 102 and a lower end portion 104. The second baffle member 92 is supported by the housing 12 so as to be spatially disposed from the first baffle member 90. Thus, the first and second baffle members 90, 92 cooperate to define the separation zone 76 of the cell assembly 60.

The upper end portion 102 of the second baffle member 92 terminates below the predetermined liquid level 82 so as to provide an upper fluid flow path between the separation zone 76 and the quiescent zone 78; whereas the lower end portion 104 of the second baffle member 92 terminates a second distance 106 from the bottom portion 14 of the housing 12 so as to provide a lower fluid flow path between the separation zone 76 and the quiescent zone 78. As can be seen in the drawings, the distance 106 between the lower end portion 104 of the second baffle member 92 and the bottom portion 14 of the housing 12 is less than the distance 101 between the lower end portion 98 of the first baffle member 90 and the bottom portion 14 of the housing 12. Further, the configuration of the first and second baffle members 90, 92 assists in separating contaminants in the wastewater in that when the wastewater is passed to the quiescent zone 78 from the separation zone 76 the wastewater is divided into three layers, an upper layer containing suspended particulate materials, an intermediate or medial layer constituting treated wastewater and a lower layer containing particulate matter having a density greater than the density of water.

The effluent reservoir assembly 94, which defines the reservoir zone 80 of the treatment cell 60, is characterized as having an upper end portion 110 and a lower end portion 112. The effluent reservoir assembly 94 is supported by the housing 12 so as to be spatially disposed from the second baffle member 92. The upper end portion 110 of the effluent reservoir assembly 94 extends upwardly above the predetermined liquid level 82 while the lower end portion 112 thereof terminates a third distance 114 from the bottom portion 14 of the housing 12 so as to define a fluid flow path between the quiescent zone 78, the reservoir zone 80 of the treatment cell 60 and a mixing zone of a second treatment cell, such as the treatment cell 62, or the effluent discharge assembly 68.

The effluent reservoir assembly 94 comprises a first substantially vertically disposed member 116 and spatially disposed second substantially vertically disposed member 118. The first member 116, which also functions as a baffle in the treatment cell 60, is provided with a plurality of openings 120 in a medial portion thereof so that the medial portion of the wastewater in the quiescent zone 78 can be directed into the reservoir zone 80 via the openings 120. The first and second members 116, 118 define an exit opening 122 between the lower ends thereof so that a flow path is established between the reservoir zone 80 and an adjacent treatment cell, such as the treatment cell 62 or the effluent discharge assembly 68 when only one treatment cell is employed in the treatment of the wastewater.

To assist in directing the water from the quiescent zone 78 to the reservoir zone 80 through the openings 120 in the first member 116 of the effluent reservoir assembly 94, as well as to substantially hinder passage of floating particles into the reservoir zone 80, the effluent reservoir assembly 94 further comprises a scoop 124. The scoop 124, which is closed on all sides and on its upper end and which is open only at its lower end 126, is connected to the first member 116 so that the scoop 124 is in a covering position relative to the openings 120. That is, the lower end 126 of the scoop 124 is placed below the openings 120 substantially as shown in FIG. 2. By placing the opening in the lower end 126 of the scoop 124 substantially below the predetermined liquid level 82, as well as the openings 120, the scoop 124 prevents floating solid particles on the surface of the wastewater from entering the reservoir zone 80.

A portion of the treated wastewater in the reservoir zone 80 is withdrawn therefrom via a conduit 130 operably connected to a pump 132 (see FIG. 7) for delivery to a mixing zone 134 of the treatment cell 62 via a conduit 136 (when the treatment cells 60, 62 are serially connected) or to the effluent discharge assembly 68 (when the apparatus 10 contains only one of the treatment cells, such as the treatment cell 60). When employing a plurality of treatment cells which are serially connected as illustrated in FIGS. 2 and 7, the treated wastewater withdrawn from the reservoir zone 80 is passed to the mixing zone 134 of the treatment cell 62 via the conduit 130, the pump 132 and the conduit 136 for discharge into the mixing zone 134 wherein the treated wastewater is again sequentially treated in the treatment cell 62 by passage therethrough. When the treatment cells 60, 62 are serially connected as illustrated in the drawings, the second member 118 of the effluent reservoir assembly 94 cooperates with a first baffle member 138 in the treatment Cell 62 to define the mixing zone 134 therebetween.

In order to provide the treated wastewater withdrawn from the reservoir zone 80 of the treatment cell 60 with a sufficient amount of air and, if desired, a chemical treating agent, the conduit 136 is provided with an injection fitting 139 (FIG. 7) so that air can be introduced into the conduit 136 for admixture with the treated wastewater therein. The amount of air injected into the conduit 136 via the injection fitting 139 can vary but will be an amount sufficient to provide the once treated wastewater with an amount of air which exceeds the solubility of the air in the once treated wastewater prior to introduction into the mixing zone 134 of the treatment cell 62. As with the mixing zone 74 of the treatment cell 60, aerated water is directed against the surface of the once treated wastewater in the mixing zone 134 of the treatment cell 62 with sufficient force so that the aerated water penetrates into the once treated wastewater and contacts the large air bubble formed in the mixing zone 134 to reduce the size of the air bubbles. The aerated water, which contains a sufficient amount of air so that the air present in the aerated water exceeds the solubility of air in water, can be discharged onto the surface of the once treated wastewater in the mixing zone 134 by a spray assembly 140 which is identical in construction and function to the spray assembly 84 heretofore described with reference to the treatment cell 60.

In order to collect sludge and particulate matter having a density greater than the density of water, the apparatus 10 is further provided with a sludge trough 142 which is connected to the housing 12 so as to be disposed adjacent and in fluid communication with the bottom portion 14 of the housing 12. The sludge trough 142 is provided with a suitable opening therein which can be selectively open and closed via valve 144 (FIG. 6) so that the sludge can be selectively removed from the sludge trough 142.

In the apparatus 10 illustrated in FIGS. 2 and 7 wherein the mixing/air flotation cell assembly 70 is disposed between the treatment cells 62, 64, the treatment cell 62 comprises the first baffle member 138, a second baffle member 150 and a partition member 152. The first baffle member 138 is spatially disposed from the second member 118 of the effluent reservoir assembly 94 of the treatment cell 60 so as to define the mixing zone 134 for the treatment cell 62 therebetween; and the second baffle member 150 is spatially disposed from the first baffle member 138 so as to define a separation zone 154 for the treatment cell 62 therebetween. The partition member 152 cooperates with the second baffle member 150 and the housing 12 to define a quiescent zone 156.

The partition member 152 is characterized as having an upper end portion 158, a lower end portion 160 and fluid flow ports 162. The partition member 152 is supported by the housing 12 so that the upper end portion 158 thereof extends upwardly above the predetermined liquid level 82. The lower end portion 160 of the partition member 152 is connected to the bottom portion 14 of the housing 12 so that fluid passage is prevented from the quiescent zone 156 of the treatment cell 62 to the mixing/air flow flotation assembly 70 except through the fluid flow ports 162.

A scoop 163, which is closed on all sides and on its upper end and is open only at its lower end 164, is connected to the partition member 152 so that the scoop 163 is in a covering position over the fluid flow ports 162 and the lower end 164 of the scoop 163 is spaced substantially below the lower margin of the lower fluid flow port 162. This places the lower end 164 of the scoop 163 (and thus an opening 165 therein) below the predetermined liquid level 82 in the quiescent zone 156 of the treatment cell 62, and prevents any floating solid particles on the surface of the wastewater from entering the opening 165 in the lower end 164 of the scoop 163 for passage through the fluid flow ports 162 and into the mixing/air flotation cell assembly 70. (See FIG. 4.)

The mixing/air flotation cell 70 comprises a pair of spatially disposed partition members 166, 168. The partition member 166 is spatially disposed relative to the partition member 152 so as to define an air flotation zone 170. The partition member 166 is characterized as having an upper end portion 172, a lower end portion 174 and a plurality of fluid flow ports, such as fluid flow port 176. The partition member 166 is supported by the housing 12 so that the upper end portion 172 thereof extends upwardly above the predetermined liquid level 82 in the air flotation zone 170. The lower end portion 174 (FIG. 4 of the partition member 166 is connected to the bottom portion 14 of the housing 12 so that fluid passage is prevented from the air flotation zone 170 to a reservoir zone 178 of the mixing/air flotation cell 70 except through the fluid flow ports 176 (only one shown).

A scoop 180 (which is closed on all sides and on its upper end and is open only at its lower end) is connected to the partition member 166 so as to be disposed in the air flotation zone 170 and in a covering position relative to the fluid flow ports 176. That is, the scoop 180 is secured to the partition member 166 so that an opening 181 in the lower end of the scoop 180 is spaced substantially below the lower margin of the lowermost fluid flow port 176. Thus, the opening 181 formed in the lower portion of the scoop 180 is disposed between the predetermined liquid level 82 in the air flotation zone 170 and prevents floating solid particles on the surface of the liquid from entering the fluid flow ports 176 for passage into the reservoir zone 178.

The partition member 168 is spatially disposed relative to the partition member 166 so as to define the reservoir zone 178 of the mixing/air flotation cell 70. The partition member 168 is characterized as having an upper end portion 184, a lower end portion 186 (FIG. 4) and a fluid flow port 188. The partition member 168 is supported by the housing 12 so that the upper end portion 184 thereof extends upwardly above the predetermined liquid level 82 in the reservoir zone 178; and the lower end portion 186 (FIG. 4) is connected to the bottom portion 14 of the housing 12.

Figure 5:
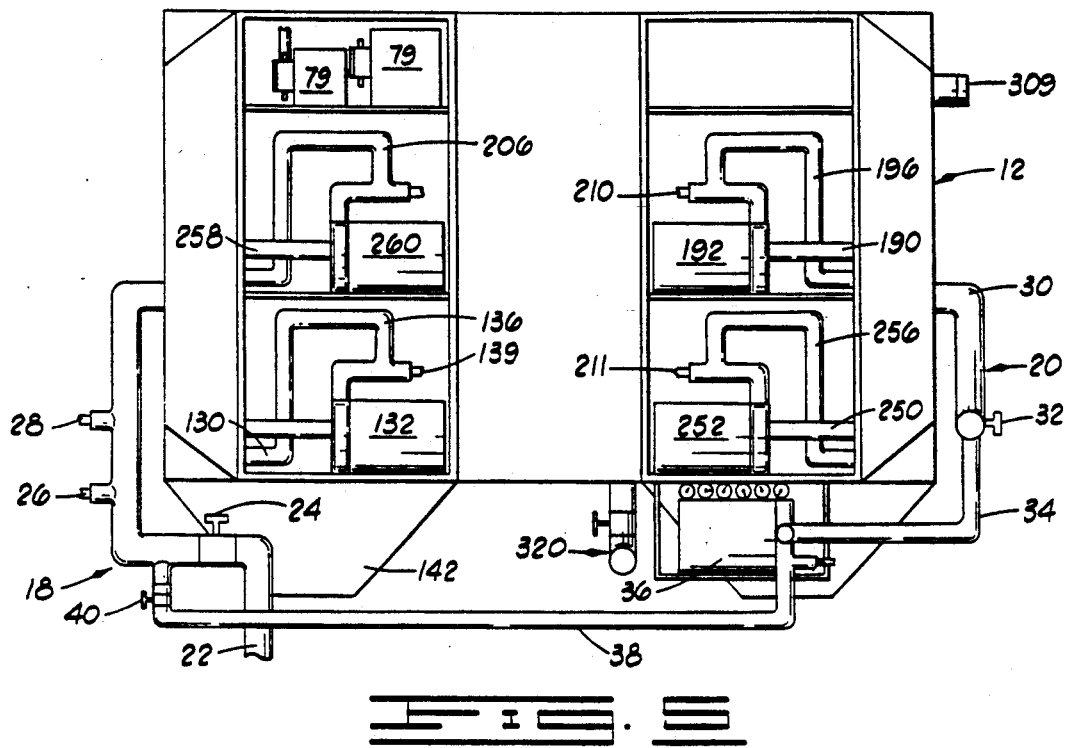
FIG. 5 is an elevational view of the wastewater treatment apparatus from one end thereof to illustrate transfer pumps, treating chemical pumps, and compressed air gauges of the apparatus.

Thrice-treated wastewater present in the reservoir zone 178 of the mixing/air flotation cell assembly 70 is withdrawn therefrom via a conduit 190 operably connected to a pump 192 (see FIGS. 5 and 7) for delivery to a mixing zone 194 of the treatment cell 64 via a conduit 196 (when the treatment cell 64 is serially connected to the mixing/air flotation cell assembly 70). It should be noted that if the level of the thrice-treated wastewater exceeds the predetermined liquid level 82 in the reservoir zone 178, the excess water contained therein can be passed to the mixing zone 194 of the treatment cell 64 through the fluid flow port 188 (FIGS. 4 and 7) formed in the upper portion 184 of the partition member 168.

Referring now to FIGS. 4 and 4A, an air injection assembly 200 is shown positioned within the air flotation zone 170 of the mixing/air flotation cell assembly 70. The air injection assembly 200 comprises a conduit 202 connected to a perforated header 204 disposed between the partition members 152, 166 so as to be in close proximity to the bottom portion 14 of the housing 12 substantially as shown. The conduit 202 is connected to a conduit 206 transporting aerated water to the spray assemblies of the apparatus 10, such as the spray assemblies 84 and 140, so that aerated water can be injected into the treated wastewater within the air flotation zone 170. The aerated water, as heretofore described, contains an amount of air sufficient to provide an excess of air which exceeds the solubility of air in the water.

The flow rate of the aerated water into the air flotation zone 170 can vary widely. Thus, the conduit 202 is provided with a valve 208 which can be employed to adjust the flow rate of the aerated water injected into the treated wastewater in the reservoir zone 178 via the header 204.

As previously stated, a major portion of the thrice-treated wastewater in the reservoir zone 178 of the air flotation zone 170 is withdrawn therefrom via the conduit 190 operably connected to the pump 192 (see FIGS. 4 and 7) for delivery to the mixing zone 194 of the treatment cell 64 via the conduit 196. In order to provide the thrice-treated wastewater with a sufficient amount of air and, if desired, chemical treating agent, the conduit 196 is provided with an injection fitting 210 (FIGS. 5 and 7) so that air can be introduced into the conduit 196 for mixture with the thrice-treated wastewater therein. The amount of air injected into the conduit 196 via the injection fitting 210 can vary but will be an amount sufficient to provide the thrice-treated wastewater with an amount of air which exceeds the solubility of air in the thrice-treated wastewater.

As with the mixing zones 74, 134 of the treatment cells 60, 62, aerated water is directed against the surface of the thrice-treated wastewater in the mixing zone 194 of the treatment cell 64 with sufficient force so that the aerated water penetrates into the thrice-treated wastewater and contacts the large air bubbles formed in the mixing zone 194 to reduce the size of the air bubbles. The aerated water, which contains a sufficient amount of air so that the air present in the aerated water exceeds the solubility of air in the water, can be discharged onto the surface of the thrice-treated wastewater in the mixing zone 194 by a spray assembly 212. The spray assembly 212 is identical in construction and function to the spray assemblies 84, 140 heretofore described with reference to the treatment cells 60 and 62.

In order to collect sludge and particulate matter having a density greater than the density of water which is separated from the wastewater in the treatment cells 64,66, the apparatus 10 is further provided with a sludge trough 214 which is connected to the housing 12 so as to be disposed adjacent and in fluid communication with the treatment cells 64,66 via the bottom portion 14 of the housing 12. The sludge trough 214 is provided with a suitable opening therein which can be selectively opened and closed via valve 216 (FIG. 6) so that the sludge can be removed from the sludge trough 214. If desired, the openings in the sludge troughs 142 and 214 can be interconnected via a conduit 218 to assist in disposal of sludge removed from the sludge troughs 142 and 214. Air and water hose connections (not shown) are provided for cleanout assistance.

The treatment cell 64, which is substantially identical in construction and function to the treatment cell 60, comprises a first baffle member 220, a second baffle member 222, and an effluent reservoir assembly 224. The first baffle member 220 cooperates with the partition member 168 of the mixing/air flotation cell 7 and the housing 12 to define the mixing zone 194 of the treatment cell 64; and the second baffle member 222 is spatially disposed from the first baffle member 220 so as to define a separation zone 226 for the treatment cell 64 therebetween. The effluent reservoir assembly 224 is spatially disposed relative to the second baffle member 222 so as to provide a quiescent zone 228 for the treatment cell 64. That is, the first baffle member 220 is supported by the housing 12 such that a lower end portion 230 thereof terminates a distance from the bottom portion 14 of the housing 12. Thus, a fluid flow passageway is formed from the mixing zone 194 to the separation zone 226.

The second baffle member 222 is substantially identical in construction to the second baffle members 92, 150 of the treatment cells 60,62, and is supported by the housing so as to be spatially disposed from the first baffle member 220. Thus, the first and second baffle members 220, 222 cooperate to define the separation zone 226 of the treatment cell 64. Further, the second baffle member 222 is supported by the housing so that an upper end portion 232 thereof terminates below the predetermined liquid level 82 in the treatment cell 64 and provides an upper fluid flow path between the separation zone 226 and the quiescent zone 228; whereas, a lower end portion 234 terminates a distance from the bottom portion 14 of the housing 12 (which corresponds to the distance 106 heretofore described with reference to the second baffle member 92) so as to provide a lower fluid flow path between the separation zone 226 and the quiescent zone 228.

The configuration of the first and second baffle members 220, 222 assists in further separation of contaminants in the thrice-treated wastewater in that when the thrice-treated wastewater is passed to the quiescent zone 228, the thrice-treated wastewater is divided into three layers, i.e., an upper layer containing suspended particulate materials, an intermediate or medial layer constituting substantially particulate-free heated wastewater, and a lower layer containing particulate matter having a density greater than the density of water.

The effluent reservoir assembly 224, which cooperates with the second baffle member 222 to define the quiescent zone 228, and which defines a reservoir zone 236 of the treatment cell 64, is characterized by having an upper end portion 238 and a lower end portion 240. The upper end portion 238 of the effluent reservoir assembly 224 extends upperly above the predetermined liquid level 82 of the thrice-treated wastewater in the treatment cell 64; and the lower end portion 240 thereof terminates a distance from the bottom portion 14 of the housing 12 so as to define a fluid flow path between the quiescent zone 228, the reservoir zone 236, and a mixing zone 241 of the treatment cell 66.

The effluent reservoir assembly 224 is substantially identical in construction with the effluent reservoir assembly 94 heretofore described, and comprises a first substantially vertically disposed member 242 and a spatially second substantially vertically disposed member 244. The first member 242, which also functions as a baffle in the treatment cell 64, is provided with a plurality of openings (only on shown) 246 which defines a fluid low path so that treated wastewater in the quiescent zone 228 can be directed into the reservoir zone 236 via the openings 246.

The first and second members 242, 244 define an exit opening (not shown, but which is similar to the exit opening 122 in the effluent reservoir assembly 94) so that a flow passage is established between the reservoir zone 236 and the adjacent treatment cell 66.

To assist in directing the thrice-treated wastewater from the quiescent zone 228 through the openings 246 in the first member 242 of the effluent reservoir assembly 224, as well as to substantially hinder passage of floating particles into the reservoir zone 236, the effluent reservoir assembly 224 further comprises a scoop 248. The scoop 248, which is identical in construction to the scoop 124 heretofore described, is closed on all sides and on its upper end so that the scoop 248 is open only at its lower end (not shown). The scoop 248 is connected to the first member 242 so that the scoop 248 is disposed in a substantially covering position over the openings 246 in the first member 242. That is, the lower end of the scoop 248 is placed below the openings 246 so that the lower end of the scoop 248 extends substantially below the predetermined liquid level 82 and the openings 246 to prevent solid particles floating on the surface on the thrice-treated wastewater from entering the reservoir zone 236.

A first portion of the thrice-treated wastewater in the reservoir zone 236 is withdrawn therefrom via a conduit 250 operably connected to a pump 252 (see FIG. 7) for delivery to a mixing zone 254 of the treatment cell 66 via a conduit 256. A second portion of the thrice-treated wastewater in the reservoir zone 236 is withdrawn therefrom via a conduit 258 operably connected to a pump 260 (see FIG. 7) for delivery to the conduit 206. The conduit 206 is connected to and in fluid communication with each of the spray assemblies employed to inject aerated water into the mixing zones of the various cell assemblies, such as the spray assemblies 84, 140, 212 and a spray assembly 266 of the treatment cell 66, as well as the air injection assembly 200 of the mixing/air flotation cell 70. Further, it is understood that valves may be used in the spray assemblies 84, 140, 212 and 266 to regulate and control the amount of aerated water injected into the mixing zones of the various cell assemblies.

The treatment cell 66, which constitutes the terminal treatment cell of the apparatus 10 shown in FIGS. 2 and 7, comprises a first baffle member 270 and a second baffle member 272. As will be more fully described hereinafter, the first baffle member 270 cooperates with the vertically disposed second member 244 of the effluent reservoir assembly 224 of the treatment cell 64 to define the mixing zone 254 in the treatment cell 66, the first and second baffle members 270, 272 cooperate to define a separation zone 274 in the treatment cell 66, and the second baffle member 272 cooperates with the effluent discharge assembly 68 to define a quiescent zone 276 in the treatment cell 66. Thus, the first and second baffle members 270, 272 cooperate with the housing to define a fluid flow path for the wastewater through the treatment cell 66; and the housing, in combination with the vertically disposed second member 244 of the effluent reservoir assembly 224 of the treatment cell 64, the first and second baffle members 270, 272 and the effluent discharge assembly 68 cooperate to define the mixing zone 254, the separation zone 274 and the quiescent zone 276 of the treatment cell 66.

The first baffle member 270 is provided with an upper end portion 278 and a lower end portion 280. The first baffle member 270 is supported by the housing 12 in a special relationship with the vertically disposed second member 244 of the effluent reservoir assembly 244 so that the upper end portion 278 extends upwardly above the predetermined liquid level 82 of the wastewater in the mixing zone 254 and the lower end portion 280 terminates a distance from the bottom portion 14 of the housing 12 which corresponds to the first distance 102 between the lower end portion 98 of the first baffle member 90 in the treatment cell 60. Thus, the first baffle member 270 and the vertically disposed second member 244 of the effluent reservoir assembly 224 cooperate to define the mixing zone 254, while the distance between the lower end portion 280 of the first baffle member 270 and the lower end portion 14 of the housing 12 cooperate to define a fluid flow passage from the mixing zone 254 to the separation zone 274 substantially as shown.

The second baffle member 272 is also provided with an upper end portion 282 and a lower end portion 284. The second baffle member 272 is supported by the housing 12 so as to be specially disposed from the first baffle member 270. Thus, the first and second baffle members 270, 272, in cooperation with the housing 12, define the separation zone 274 of the treatment cell 66.

The upper end portion 282 of the second baffle member 272 terminates below the predetermined liquid level 82 of the wastewater in the treatment cell 66 so as to provide an upper fluid flow path between the separation zone 274 and the quiescent zone 276; whereas, the lower end portion 284 of the second baffle member 272 terminates a distance from the bottom portion 14 from the housing 12 so as to be disposed below the lower end portion 280 of the first baffle member 270 substantially as shown. Thus, the lower end portion 284 of the second baffle member 272 cooperates with the bottom portion 14 of the housing 12 to define a lower fluid flow path between the separation zone 274 and the quiescent 276 in the treatment cell 66.

The configuration of the first and second baffle members 270, 272 assists in separating any remaining contaminants in the wastewater when the wastewater is passed to the quiescent zone 276 from the separation zone 274. That is, when the wastewater is passed to the quiescent zone 276 along the upper and lower fluid flow paths provided by the second baffle member 272, the wastewater is divided into three layers, an upper layer containing any suspended particulate material remaining in the wastewater, an intermediate or medial layer, constituting the treated wastewater, and a lower layer containing particulate matter having a density greater than the density of water.

As with the mixing zones 74, 134 and 194 of the treatment cells 60, 62 and 64, respectively, aerated water is directed against the surface of the thrice-treated wastewater in the mixing zone 254 of the treatment cell 66 with sufficient force so that that the aerated water penetrates into the thrice-treated wastewater and contacts any large air bubbles formed in the mixing zone 254 to reduce the size of the air bubbles. The aerated water, which contains a sufficient amount of air so that the air present in the aerated water exceeds the solubility of air in water, can be discharged onto the surface of the wastewater in the mixing zone 254 by a spray assembly 286 which is connected to and in fluid communication with the conduit 206. The spray assembly 286 is identical in construction and function to the spray assembly 84 heretofore described with reference to the treatment cell 60.

The treated wastewater present in the quiescent zone 276 of the cell 66 (now treated five times) is discharged from the quiescent zone 276 of the cell 66 and into an effluent discharge assembly 68 wherein the effluent can be selectively discharged for disposal, for reuse, or for recycling through the apparatus 10. The effluent discharge assembly 68 comprises an angularly disposed member 288, an effluent discharge housing 290 and a skimmings receiving housing 292. The angularly disposed member 288 is supported by the housing so as to be spatially disposed from the second baffle member 272 of the cell 66. The angularly disposed member 288, which cooperates with the second baffle member 276 to define the quiescent zone 276 in treatment cell 66, is provided with an upper end portion 294, a lower end portion 296, and a plurality of fluid flow ports 298 extending therethrough substantially as shown. The angularly disposed member 288 is connected to the housing 12 so that the upper end portion 294 thereof extends upwardly above the predetermined liquid level 82 of the treated wastewater in the quiescent zone 276 of the treatment cell 66.

The lower end portion 296 of the angularly disposed member 288 is connected to a bottom plate 300 which is supported by and connected to the lower portion 14 of the housing 12. Thus, the angularly disposed member 288 cooperates with effluent discharge housing to 290, the skimmings receiving housing 292 at the bottom plate 300, to form an effluent chamber 302 into which the fourth-treated wastewater in the quiescent zone 276 of the cell 66 can be passed via the fluid flow ports 298. A scoop 304, which is closed on all sides and is open at its lower end (not shown), is connected to the angularly disposed member 288 such that the lower end of the scoop 304 is placed substantially below the lower margin of the lowermost fluid flow port 298. This places the lower end of the scoop 304 (and thus the opening therein) below the predetermined liquid level 82 in the quiescent zone 276 of the treatment cell 66, and prevents any floating solid particles on the surface of the treated wastewater in the quiescent zone 276 from entering the opening in the lower end of the scoop 304 for passage through the fluid flow ports 298 and into the effluent chamber 302.

The effluent discharge housing 290 is provided with a fluid inlet opening 306 in an upper portion 308 thereof so that treated wastewater in the effluent chamber 302 can be passed into the effluent discharge housing 290 via the fluid inlet opening 306 for passage from the housing 12 via the fluid outlet assembly 20. The upper portion of the effluent discharge housing 290 is also provided with an overflow port 309 in an upper end thereof.

To selectively control the amount of treated wastewater discharged from the effluent chamber 30 into the effluent discharge housing 290 via the fluid inlet opening 306 thereof, the effluent discharge housing 290 is provided with an adjustable weir 310. The adjustable weir 310 permits one to selectively adjust the fluid inlet opening 30 in the effluent discharge housing 290 to control the flow of effluent from the effluent chamber 302 into the effluent discharge housing 290.

The skimmings receiving housing 292 is supported by the housing 12 so as to be disposed substantially adjacent the effluent discharge housing 290 and one end 312 of the angularly disposed member 288. It should be noted that the unique configuration of the effluent chamber 302 enhances the passage of particulate matter floating on the surface of the treated wastewater in the effluent chamber 302 to selectively enter the skimmings receiving housing 292.

The skimmings receiving housing 292 is provided with a skimmings inlet opening 314 formed in an upper end portion 315 thereof so as to openly communicate with the effluent chamber 302. A lower end portion (not shown) is provided with suitable openings so as to permit skimmings discharged into the skimmings receiving housing 292 to be discharged therefrom. That is, the lower end portion of the skimmings receiving housing 292 is provided with a skimmings outlet slot so that skimmings separated from the effluent in the effluent chamber 302 can be discharged from the skimmings receiving housing 292 via the openings provided in the lower portion thereof.

In order to effectively control the flow rate of skimmings separated from the effluent into the skimmings receiving housing 292 via the skimmings inlet opening 314, the skimmings receiving housing 292 is provided with an adjustable weir 316.

Referring now to FIG. 2, the apparatus 10 is illustrated as further comprising a skimmings trough 318 supported by the housing 12 so as to be disposed adjacent each of the treatment cells 60-66, the effluent discharge assembly 68 and the mixing/air flotation cell 70. The skimmings trough 318 is provided with a discharge assembly 320 which can be selectively moved between an open and closed position so that skimmings deposited within the skimmings trough 318 can be discharged therefrom through the discharge assembly 320. Further, the lower end portion of the skimmings receiving housing 292 and the skimmings discharge slots formed therein openly communicate with the skimmings trough 318 so that skimmings entering into the skimmings receiving housing 392 via the skimmings inlet opening 314 can be discharged into the skimmings trough 318.

In the treatment of wastewater using the apparatus 10 of the present invention, froth is generated in the separation zone and first quiescent zone of each of the treatment cells, as well as in the mixing/air flotation cell 70.

In order to selectively control the amount of froth on the surface of the wastewater in each of the treatment cells 60-66 and the mixing/air flotation cell 70, the apparatus 10 is further provided with a plurality of adjustable weir assemblies 322, 324, 326, 328 and 330 which selectively adjust the effective heights of openings formed in the housing 12 substantially adjacent the separation and quiescent zone of each of the treatment cells, as well as the air flotation zone 170 of the mixing-/air flotation cell 70.

Weirs and weir assemblies such as the adjustable weirs 310, 316 and the adjustable weir assemblies 322-330, as well as their use and function, are well known in the art. Thus, no further description of the adjustable weirs or weir assemblies incorporated into the apparatus 10 of the present invention is believed necessary in order to enable one skilled in the art to understand and practice the inventive concept disclosed herein.

The operation of the wastewater treatment apparatus 10 will now be described with reference to FIGS. 1, 2 and 7. Wastewater is supplied from a reservoir by a main transfer pump to the fluid inlet assembly 18. An excess of pressurized air is injected into the wastewater via air injection fitting 26, and optional chemical treating agent is injected via chemical injection fitting 28 to form a mixture of wastewater, air and chemical treating agent, referred to hereinafter as the wastewater mixture.

The wastewater mixture is passed to the internal chamber 16 of the housing 12, the internal chamber 16 consisting of treatment cells 60, 62, 64, 66 and the mixing/air flotation cell 70 in combination with an effluent discharge assembly 68. The process by which the wastewater mixture is treated is substantially the same in treatment cells 60, 62, 64, and 66. Thus only the process in treatment cell 60, mixing/air flotation cell 70 and the effluent discharge assembly 68 will be described in detail.

The wastewater mixture is discharged into the mixing zone 74 of the first treatment cell 60, so that the excess air forms large air bubbles which move toward the surface of the wastewater mixture. Aerated treated wastewater containing an excess of pressurized air is recycled from an intermediate cell, such as treatment cell 64, and directed against the surface of the wastewater in the mixing zone 74 so that the large air bubbles are broken into small air bubbles.

Referring now to FIGS. 2 and 7 in conjunction with FIG. 3, the wastewater mixture is passed from the mixing zone 74 under the first baffle member 90 to the separation zone 76, the separation zone 76 including a second baffle member 92 positioned so that a first portion of the wastewater flows over the second baffle member 92 and a second portion of the wastewater flows under the second baffle member 92 to form a top layer, a bottom layer and a medial or intermediate layer in the quiescent zone 78. The top layer will contain an increased amount of suspended solids and oil and grease brought to the surface by attachment to the small air bubbles, while the bottom layer of the wastewater will contain an increased amount of denser materials having a density exceeding the density of the wastewater. The medial or intermediate layer will contain a reduced amount of hydrocarbons and suspended solids.

The quiescent zone 78 is characterized by reduced turbulence so that suspended solids and hydrocarbons float to the surface with the assistance of air bubbles and treatment chemical to form a froth at the surface while the denser solids which settle to the bottom remain at the bottom. A middle layer of once-treated wastewater containing a reduced amount of suspended solids and hydrocarbons is thus produced. The reduced turbulence in the quiescent zone 78 promotes the growth of the froth into a blanket which is periodically skimmed into the skimmings trough 318.

The chemical treating agent injected into the wastewater via the chemical injection fitting 28 promotes the aggregation of smaller particles into larger particles so that pollutants are more readily settled to the bottom or floated to the surface with the assistance of air bubbles. A portion of the chemical treating agent may remain in the wastewater mixture after a portion of the suspended solids and hydrocarbons have been removed in the first treatment cell 60.

The wastewater mixture is passed from the quiescent zone 78 through the scoop 124 and the openings 120 to the reservoir zone 80. The scoop 124 mounted on the effluent reservoir assembly 94 within the quiescent zone 78 prevents froth gathered at the surface of the quiescent zone 78 from being drawn into the reservoir zone 80.

The wastewater within the reservoir zone 80 contains a reduced level of hydrocarbons and suspended solids and, in some cases, will be suitable for discharge or reuse. While the embodiment described herein consists of multiple treatment cells, certain wastewaters can be successfully treated in a single treatment cell by the present process to produce a treated wastewater which complies fully with federal, state and local regulations for discharge to sewer. Where only a single treatment cell is required, the treated wastewater is passed from the reservoir zone 80 directly to the effluent discharge assembly 68.

In the present embodiment of the apparatus 10 of the present invention, the wastewater mixture is withdrawn via conduit 130 in conjunction with pump 132 from the reservoir zone 80 of the first treatment cell 60, injected with an additional amount of air via injection fitting 138, and introduced through conduit 136 into the mixing zone 134 of the second treatment cell 64. Removal of additional quantities of pollutants is effected in the second treatment cell 64 by a process substantially identical to that already described for the first treatment cell 60.

From the quiescent zone 156 of the second treatment cell 62 the wastewater is passed through the opening 165 (FIG. 4) in the bottom of the scoop 163 and the fluid flow ports 162 in the partition 152 to the mixing/air flotation cell 70, the partition 152 also serving as the first end wall of the mixing/air flotation cell 70.

In the mixing/air flotation cell 70, the wastewater is combined with the aerated water in the air flotation zone 170, the aerated water being introduced into the air flotation zone of the mixing/air flotation cell 70 through the air injection assembly 200 positioned within the air flotation zone 170 of the mixing/air flotation cell 70 in close proximity to the bottom portion 14 of the housing 12 (see FIGS. 4 and 4A) so that excess air present in the aerated water forms bubbles of a preselected size. The bubbles attach to suspended solids and hydrocarbons and cause the suspended solids and hydrocarbons to float to the surface in a froth. The wastewater, having yet further reduced levels of suspended solids and hydrocarbons, is then passed through the opening 181 in the lower end of the scoop 180 and the fluid flow ports 176 in the partition 166 into the reservoir zone 178.

The wastewater mixture is withdrawn from the reservoir zone 178 of the mixing/air flotation cell 70 and treated serially in treatment cell 64 and treatment cell 66. Additional pressurized air is injection into the wastewater via injection fittings 210 and 211 prior to introduction of the wastewater into the mixing zones 194 and 254 of treatment cells 64 and 66, respectively. Removal of additional quantities of pollutants is effected in treatment cells 64 and 66 by substantially the same process as that already described for the first treatment cell 60.

From the quiescent zone 276 of the fourth treatment cell 66 the wastewater is passed through the fluid inlet (not shown) in the bottom of the scoop 304 and the fluid flow ports 298 in the angularly disposed member 288 to the effluent chamber 302. Any remaining surface scum is passed over the adjustable weir 316 and through the skimmings receiving housing 292 to the skimmings trough 318. Treated wastewater is passed over the adjustable weir 310 and through an outlet port (not shown) in the housing 12 to the fluid outlet assembly 20.

In the present embodiment, the aerated water is recycled from treatment cell 64 through suction conduit 258 and transfer pump 260 to the spray assemblies 84, 140, 212 and 266 of treatment cells 60, 62, 64 and 66, respectively, and also to the perforated header 204 of the air injection assembly 200 in the air flotation zone 170 of the mixing/air flotation cell 70 via conduit 202. Where fewer treatment cells are used, the aerated water may be recycled from any treatment cell producing treated water reasonably free from contaminants which might plug the perforations in the spray assemblies 84, 140, 212, conduit 206 and the perforated header 204.

According to the presently preferred embodiment, the treated wastewater can be recirculated through the apparatus 10 for additional treatment. A portion of the treated wastewater is passed to the wastewater inlet line 22 via the recirculation pump 36 and the recirculation conduits 34, 38. Additional pressurized air is injected into the recirculated wastewater via the air injection fitting 37. The recirculation of the entire treated wastewater flow results in a batch process by which additional treatment of wastewater is effected.

The froth formed in the treatment cells 60, 62, 64 and 66 and in the mixing/air flotation cell 70 is passed to a skimmings trough 318. Adjustable skimming weirs 322–330 are used to control the volume of froth which is removed. Collected skimmings are discharged from the apparatus 10 as required through skimmings discharge assembly 320.

Figure 6:
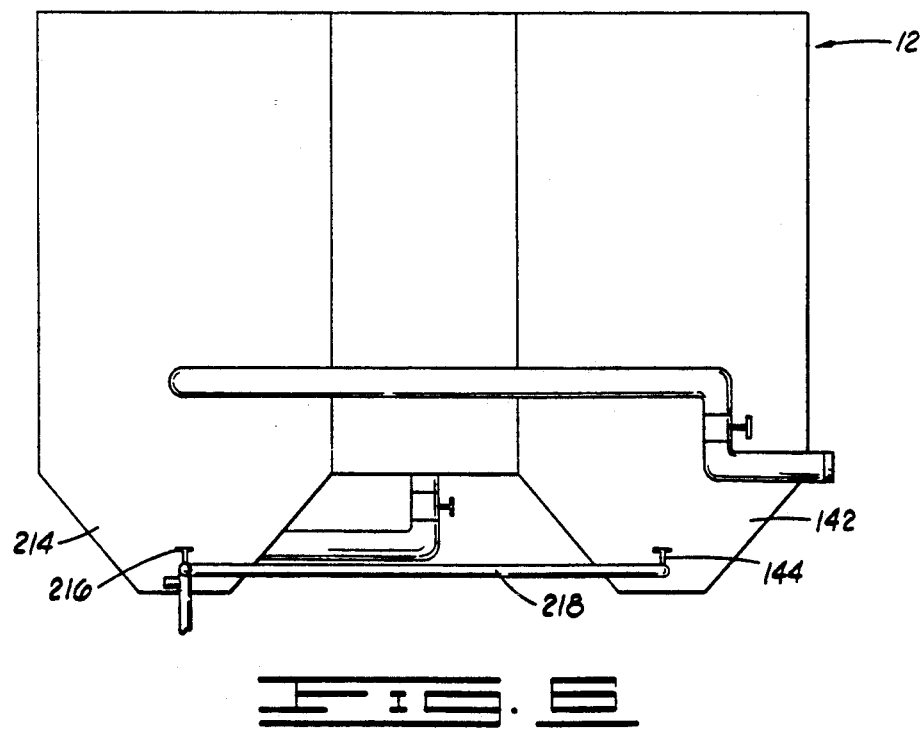
FIG. 6 is an elevational view of the wastewater treatment apparatus from the opposite end showing drain and cleanout piping.

Referring to FIGS. 2 and 6, settled contaminants, usually very dense materials, are collected in the sludge troughs 142, 214 supported by the housing 12 and discharged from the apparatus as required via openings (not shown) in the sludge troughs 142, 214 which can be selectively opened and closed via valves, 144, 216, respectively.

It will be clear that the present invention is well adapted to carry out the objects and attain the advantages mentioned as well as those inherent therein. While a presently preferred embodiment of the invention has been described for purposes of this disclosure, numerous changes can be made which will readily suggest themselves to those skilled in the art and which are encompassed within the spirit of the invention disclosed and as defined in the appended claims

What is claimed is:

1. A wastewater treatment apparatus comprising:
a housing having a bottom and defining an internal chamber, with a mixing zone comprising a portion of the internal chamber;
means for introducing wastewater into the mixing zone, means for introducing air into the wastewater prior to the wastewater being introduced into the mixing zone in an amount sufficient so that large air bubbles are formed in the mixing zones; and
spray means for spraying water into the wastewater in the mixing zone so that the sprayed water contacts the large air bubbles in the mixing zone and substantially reduces the size of the large air bubbles in the mixing zone.

2. The apparatus of claim 1 further comprising:
means for injecting an effective amount of a chemical treating agent into the wastewater prior to introducing the wastewater into the mixing zone.

3. The apparatus of claim 1 wherein the internal chamber has a separation zone and wherein the apparatus further comprises:
a first baffle member supported by the housing so as to be spatially disposed from an end of the internal chamber, the end of the internal chamber and the first baffle member cooperating to define the mixing zone, the first baffle member having an upper end portion and a lower end portion, the upper end portion extending upwardly above a predetermined liquid level, the lower end portion terminating a first distance from the bottom of the housing so as to provide a fluid flow passageway from the mixing zone to the separation zone.

4. The apparatus of claim 3 wherein the wastewater has suspended solids, oil and grease therein and wherein the internal chamber has a quiescent zone, and wherein the apparatus further comprises:

a second baffle member supported by the housing so as to be spatially disposed from the first baffle member, the first and second baffle members cooperating to define the separation zone, the second baffle member having an upper end portion and a lower end portion, the upper end portion of the second baffle member disposed below the liquid level so as to provide an upper fluid flow passageway from the separation zone to the quiescent zone, the wastewater in the separation zone forming an upper layer of wastewater containing increased amounts of suspended solids and oil and grease in the wastewater with the upper layer of wastewater passing from the separation zone through the upper fluid flow passageway and into the quiescent zone and the wastewater in the separation zone forming a lower layer of wastewater containing increased amounts denser materials exceeding the density of water with the lower layer of wastewater passing from the separation zone through the lower fluid passageway and into the quiescent zone, the suspended solids and oil and grease remaining on a surface of an upper layer in the quiescent zone while the denser solids sink to a bottom layer in the quiescent zone and a middle layer being formed in the quiescent zone containing a treated wastewater, the treated wastewater being passed from the middle layer of the quiescent zone into the reservoir zone and passed from the reservoir zone to an effluent discharge zone.

5. The apparatus of claim 4 wherein the internal chamber has a reservoir zone, and wherein the apparatus further comprises:
effluent reservoir means for forming the reservoir zone containing treated wastewater, the effluent reservoir means supported by the housing so as to be spatially disposed from the second baffle member, the second baffle member and the effluent reservoir means cooperating to define the quiescent zone, the effluent reservoir means having an upper end, a lower end, a fluid inlet opening and a fluid outlet opening, the upper end of the effluent reservoir means extending upwardly above the predetermined liquid level, the lower end terminating a third distance from the bottom of the housing so as to define a fluid flow passage between the reservoir zone, the quiescent zone and an effluent discharge zone.

6. The apparatus of claim 5 wherein the spray means further comprises:
effluent transfer means for selectively passing portion of the treated wastewater from the effluent reservoir means to the spray means.

7. The apparatus of claim 9 wherein the apparatus further comprises:
effluent discharge means for discharging the treated wastewater from the effluent discharge zone, the effluent discharge means supported by the housing so as to be spatially disposed from the effluent reservoir means so as to define the effluent discharge zone therebetween.

8. The apparatus of claim 7 wherein the housing is provided with an outlet port and wherein the effluent discharge means comprises:
an angularly disposed baffle member supported by the housing so as to be spatially disposed from the effluent reservoir means, the angularly disposed baffle member having an upper end portion, a lower end portion and a fluid flow port extending through a medial portion thereof, the upper end portion extending upwardly above a predetermined liquid level in the effluent reservoir zone, the lower end portion of the angularly disposed baffle connected to the bottom of the housing; and
effluent receiving means supported by the housing for receiving treated wastewater from the effluent discharge zone and for discharging the treated wastewater from the housing via the outlet port thereof.

9. The apparatus of claim 8 further comprises:
first scoop means supported by the effluent reservoir means for covering the fluid inlet opening therein, the first scoop means having a lower end portion which terminates a distance below the fluid inlet opening of the effluent reservoir means, the lower end portion of the first scoop means having a fluid inlet port which openly communicates with the fluid inlet opening of the effluent reservoir means.

10. The apparatus of claim 3 further comprising:
second scoop means supported by the angularly disposed baffle member for covering the fluid flow port therein, the second scoop means having a lower end portion which terminates a distance below the fluid flow port of the angularly disposed baffle member, the lower end portion of the second scoop means having a fluid inlet port which openly communicates with the fluid flow port of the angularly disposed baffle member.

11. The apparatus of claim 10 wherein the internal chamber of the housing is further provided with a mixing/air flotation zone formed between the effluent reservoir and the angularly disposed baffle member, and wherein the apparatus further comprises:
a first partition member supported by the housing so as to be spatially disposed relative to the effluent reservoir means, the effluent reservoir means and the first partition member cooperating to define a second quiescent zone, the first partition member having an upper end portion, a lower end portion and at least one fluid passage port formed through a medial portion thereof, the upper end portion extending upwardly above the liquid level, the lower end portion connected to the bottom of the housing;
a second partition member supported by the housing so as to be spatially disposed from the first partition member, the first and second partition members cooperating to define an air flotation zone, the second partition member having an upper end portion, a lower end portion and at least one fluid passage port formed through a medial portion thereof, the upper end portion extending upwardly above the liquid level, the lower end portion connected to the bottom of the housing;
air injection means for injecting air into the treated wastewater in the air flotation zone, the air injection means supported within the air flotation zone so as to be disposed in close proximity to the bottom of the housing; and
a third partition member supported by the housing so as to be spatially disposed relative to the second partition member and the angularly disposed baffle member, the second and third partition members cooperating to define a third quiescent zone, the third partition member and the angularly disposed baffle member cooperating to define a fourth quiescent zone, the third partition member having an upper end portion, a lower end portion and at least one fluid passage port for providing a fluid flow passageway between the third quiescent zone and the fourth quiescent zone, the upper end portion of the third partition member extending upwardly above the liquid level, the lower end thereof connected to bottom of the housing.

12. The apparatus of claim 11 further comprising:
third scoop means supported by the first partition member for covering the fluid passage port thereof, the third scoop means having a lower end portion terminating a distance below the fluid passage port of the first partition member, the lower end portion of the third scoop means having a fluid inlet port openly communicating with the fluid passage port of the first partition member; and
fourth scoop means supported by the second partition member for covering the fluid passage port thereof, the fourth scoop means having a lower end portion terminating a distance below the fluid passage port of the second partition member, the lower end of the fourth scoop means having a fluid inlet port which openly communicates with the fluid passage port of the second partition member.

13. The apparatus of claim 12 further comprising:
weir means supported by the housing for removing froth from the surface of the wastewater in the separation zone, the quiescent zone, the air flotation zone, and the effluent discharge zone, the weir means being selectively adjustable between a retracted position and an extended position, in the retracted position the weir means being disposed substantially adjacent the housing, in the extended position the weir means extending upwardly a selected distance above the housing so as to selectively control the amount of froth skimmed from the surface of the wastewater.

14. The apparatus of claim 7 further comprising:
weir means supported by the housing for removing froth from the surface of the wastewater in the separation zone, the quiescent zone and the effluent discharge zone, the weir means being selectively adjustable between a retracted position and an extended position, in the retracted position the weir means being disposed substantially adjacent the housing, in the extended position the weir means extending upwardly a selected distance above the housing so as to selectively control the amount of froth skimmed from the surface of the wastewater.

15. The apparatus of claim 4 wherein the lower end portion of the second baffle member terminates a second distance from the bottom of the housing so as to provide a lower fluid passageway from the separation zone to the quiescent zone, the second distance between the lower end portion of the second baffle member and the bottom of the housing being less than the first distance between the lower end portion of the first baffle member and the bottom of the housing, and the wastewater in the separation zone forming a lower layer of wastewater containing increased amounts of denser materials exceeding the density of water with the lower layer of wastewater passing from the separation zone through the lower fluid passageway and into the quiescent zone, the suspended solids and oil and grease remaining in the wastewater remaining on a surface of an upper layer in the quiescent zone while the denser solids sink to a bottom layer in the quiescent zone and the middle layer being formed in the quiescent zone containing treated wastewater.

16. The apparatus of claim 1 further comprising:
means for injecting compressed air into the water prior to the water being sprayed by the spray means into the mixing zone.

17. The apparatus of claim 10 further comprising:
first scoop means supported by the effluent reservoir for covering the fluid inlet opening therein, the first scoop means having a lower end portion which terminates a distance below the fluid inlet opening of the effluent reservoir assembly the lower end portion of the first scoop means having a fluid inlet port which openly communicates with the fluid inlet opening of the effluent reservoir assembly.

18. The apparatus of claim 17 further comprising:
second scoop means supported by the angularly disposed baffle member for covering the fluid flow port therein, the second scoop means having a lower end portion which terminates a distance below the fluid flow port of the angularly disposed baffle member, the lower end portion of the second scoop means having a fluid inlet port which openly communicates with the fluid flow port of the angularly disposed baffle member.

19. The apparatus of claim 16 further comprising:
means for regulating the pressure of the compressed air injected into the wastewater prior to the wastewater being introduced into the mixing zone for adjusting the size of the large air bubbles in the mixing zone; and
means for regulating the pressure of the compressed air injected into the water being sprayed in the mixing zone by the spray means for adjusting the reduction in the size of the large air bubbles in the mixing zone.

20. An apparatus for removing contaminates from industrial wastewater to produce an effluent suitable for discharge or recycle, the apparatus comprising:
a housing having a bottom and defining an internal chamber, the internal chamber having a plurality of serially connected treatment cells comprising a first treatment cell and a terminal treatment cell, each of the treatment cells having a mixing zone, a separation zone, a quiescent zone and a reservoir zone, the housing cooperating with the terminal treatment cell to define an effluent discharge zone, the housing having an inlet port communicating with the mixing zone of the first treatment cell and an outlet port communicating with the effluent discharge zone;
means for introducing wastewater into the mixing zone of the first treatment cell via the inlet port of the housing means for introducing air into the wastewater prior to the wastewater being introduced into the mixing zone in an amount sufficient so that large air bubbles are formed in the mixing zone;
spray means for spraying water into the mixing zone of each of the treatment cells so that the sprayed water contacts the large air bubbles in the mixing zone and substantially reduces the size of the large air bubbles in the mixing zone;
effluent transfer means for selectively passing a portion of a treated wastewater from each of the reservoir zones, to the mixing zone of each subsequently disposed treatment cell;

means for introducing air into the treated wastewater prior to discharge of the treated wastewater into the mixing zone of the subsequent treatment cell so that large air bubbles are formed in the mixing zone of said subsequent treatment cell;

effluent discharge means for discharging a treated wastewater from the housing; and wherein each of the treatment cells comprises:

a first baffle member and a second baffle member and except for terminal cell, and wherein the first treatment cell and each of at least some of the subsequent treatment cell includes an effluent reservoir means wherein:

(a) the first baffle member of the first treatment cell being spatially disposed from one end of the internal chamber so as to define the mixing zone of the first treatment cell, the first baffle member of each subsequent treatment cell spatially disposed from the preceding treatment cell so as to define the mixing zone of each subsequent treatment cell, each first baffle member having an upper end portion and a lower end portion, the upper end portion extending upwardly above a predetermined liquid level, the lower end portion terminating a first distance from the bottom of the housing so as to provide a fluid flow passageway from the mixing zone of each treatment cell to the separation zone thereof;

(b) the second baffle member being spatially disposed from the first baffle member so as to define the separation zone therebetween, the second baffle member having an upper end portion and a lower end portion, the upper end portion disposed below the liquid level to provide an upper fluid flow passageway from the separation zone to the quiescent zone; and (c) the effluent reservoir means, which defines the reservoir zone, being spatially disposed from the second baffle member, the second baffle member and the effluent reservoir means cooperating to define the quiescent zone, the effluent reservoir means having an upper end portion, a lower end portion, a fluid inlet opening and a fluid outlet opening, the first end portion thereof extending upwardly above the liquid level, the lower end portion terminating a distance from the bottom of the housing so as to provide a fluid flow passageway between the reservoir zone, the quiescent zone and the effluent discharge zone; and wherein the apparatus further comprises:

an angularly disposed baffle member spatially disposed between the quiescent zone of the terminal treatment cell and the effluent discharge means so as to define the effluent discharge zone, the angularly disposed baffle member having an upper end portion, a lower end portion and a fluid flow port extending therethrough, the upper end portion extending upwardly above the liquid level, the lower end portion connected to the bottom portion of the housing such that fluid communication between the effluent discharge zone formed between the angularly disposed baffle member, the quiescent zone of the terminal treatment cell and the effluent discharge means is established through the fluid flow port in the angularly disposed baffle member.

21. The apparatus of claim 20 further comprising:
means for injecting an effective amount of a chemical treating agent and the air into the wastewater prior to introducing the wastewater into the mixing zone.

22. The apparatus of claim 20 further comprising:
weir means supported by the housing for removing froth from the surface of the wastewater in the separation zone, the quiescent zone, and the effluent discharge zone, the weir mean being selectively adjustable between a retracted position and an extended position, in the retracted position the weir means being disposed substantially adjacent the housing, in the extended position the weir means extending upwardly a selected distance above the housing so as to selectively control the amount of froth skimmed from the surface of the wastewater.

23. The apparatus of claim 20 further comprising:
a sludge trough supported by the bottom portion of the housing so as to openly communicate with each of the treatment cells.

24. The apparatus of claim 20 further comprising:
an angularly disposed baffle member spatially disposed between the quiescent zone of the terminal treatment cell and the effluent discharge means so as to define the effluent discharge zone, the angularly disposed baffle member having an upper end portion, a lower end portion and a fluid flow port extending therethrough, the upper end portion extending upwardly above a predetermined liquid level, the lower end portion connected to the bottom of the housing such that fluid communication between the effluent discharge zone formed between the angularly disposed baffle member, the quiescent zone of the terminal treatment cell and the effluent discharge means is established through the fluid flow port in the angularly disposed baffle member.

25. The apparatus of claim 20 wherein the lower end portion of the second baffle member is defined further as terminating a distance from the bottom of the housing to provide a lower fluid flow passageway from the separation zone, the distance between the lower end portion of the second baffle member and the bottom of the housing being less than the first distance between the lower end portion of the first baffle member and the bottom of the housing.

* * * * *

UNITED STATES PATENT AND TRADEMARK OFFICE
CERTIFICATE OF CORRECTION

PATENT NO. : 5,288,737
DATED : February 22, 1994
INVENTOR(S) : Joseph P. Krieger It is certified that error appears in the above-identified patent and that said Letters Patent is hereby corrected as shown below:

Column 2, line 25, after the word "disposal", please insert a --.--.

Column 2, line 29, after the word "material", please insert a --.--.

Column 7, line 61, please delete the "i", and substitute therefore --in--.

Column 12, line 62, please delete "7", and substitute therefore --70--.

Column 13, line 57, please delete "low", and substitute therefore --flow--.

Column 15, line 54, please delete "286", and substitute therefore --84--.

Column 16, line 36, please delete "308".

Column 16, line 45, please delete "30", and substitute therefore --302--.

Column 16, line 50, please delete "30", and substitute therefore --306--.

UNITED STATES PATENT AND TRADEMARK OFFICE
CERTIFICATE OF CORRECTION

PATENT NO. : 5,288,737
DATED : February 22, 1994
INVENTOR(S) : Joseph P. Krieger It is certified that error appears in the above-identified patent and that said Letters Patent is hereby corrected as shown below:

Column 17, line 26, please delete "392", and substitute therefore --292--.

Column 21, line 54, please delete "9", and substitute therefore --5--.

Column 24, line 7, please delete "10", and substitute therefore --16--.

Signed and Sealed this

Fourth Day of October, 1994

Attest:

BRUCE LEHMAN

*Attesting Officer*    *Commissioner of Patents and Trademarks*